United States Patent [19]
Warkus et al.

[11] Patent Number: 5,269,619
[45] Date of Patent: Dec. 14, 1993

[54] CONNECTION OF SECTIONAL BARS, OF A SUPPORT SYSTEM FOR A SANITARY APPARATUS

[75] Inventors: Clemens Warkus, Wald, Fed. Rep. of Germany; Walter Eggenberger, Tann-Ruti, Switzerland

[73] Assignee: Geberit AG, Jona, Switzerland

[21] Appl. No.: 810,841

[22] Filed: Dec. 20, 1991

[30] Foreign Application Priority Data

Dec. 21, 1990 [CH] Switzerland .................. 4087/90

[51] Int. Cl.$^5$ .................................................. F16B 2/18
[52] U.S. Cl. ........................... 403/240; 403/255; 403/263; 403/381; 403/20; 52/738
[58] Field of Search ............. 403/240, 241, 242, 248, 403/257, 409.1, 194, 187, 263, 252–255, 381, 20, 6, 19, 167, 168, 405.1, 407.1; 52/127.11, 731, 738; 29/897.3, 897.33

[56] References Cited

U.S. PATENT DOCUMENTS

| | | | |
|---|---|---|---|
| 687,114 | 11/1901 | Brown | 403/381 X |
| 3,574,367 | 4/1971 | Jankowski | 403/409.1 X |
| 3,697,104 | 10/1972 | Soulie et al. | 403/322 X |
| 3,816,011 | 6/1974 | Biebuyck et al. | 403/187 |
| 3,945,742 | 3/1976 | Condevaux | 403/192 X |
| 4,069,638 | 1/1978 | Hasselquist et al. | 52/738 X |
| 4,345,849 | 8/1982 | Stenemann | 403/252 |
| 4,490,064 | 12/1984 | Ducharme | 403/252 X |
| 4,572,694 | 2/1986 | Hoeksema | 403/187 |
| 4,799,819 | 1/1989 | Swoboda | 403/187 X |
| 4,907,388 | 3/1990 | Siahatgar | 403/252 X |

FOREIGN PATENT DOCUMENTS

| | | | |
|---|---|---|---|
| 146666 | 7/1985 | European Pat. Off. | 52/738 |
| 2239370 | 3/1973 | Fed. Rep. of Germany | 403/264 |
| 2518192 | 6/1983 | France | 403/403 |
| 2052003 | 1/1981 | United Kingdom | 403/187 |

*Primary Examiner*—Randolph A. Reese
*Assistant Examiner*—Harry C. Kim
*Attorney, Agent, or Firm*—McGlew and Tuttle

[57] ABSTRACT

The connection has a connection piece (1) which has two displaceable wedges (4, 13) in a bearing housing (8). These wedges (4, 13) can be displaced in the bearing housing (8) independently of one another by a guide bearing (15, 16). In the working position, the wedge (4) extends into a dovetailed longitudinal groove (20) of a sectional bar (2). The front side (5) of the wedge (4) is profiled and engages a correspondingly profiled wall (22) of the sectional bar (2) in a positive-locking manner. The wedge (4) spreads two clamping tongues of the bearing housing (8) against the flanks of the longitudinal groove (20). By pivoting the guide bearing (15), the wedge (4) can be retracted, and the connection can be separated. A second wedge (13) is inserted axially into the interior space of a second profiled piece (3). This wedge (13) spreads two brackets (11) of the bearing housing (8). Both sectional bars (2, 3) have the same design and may be cut off to any desired length. No further processing of the sectional bars (2, 3) is necessary.

10 Claims, 6 Drawing Sheets

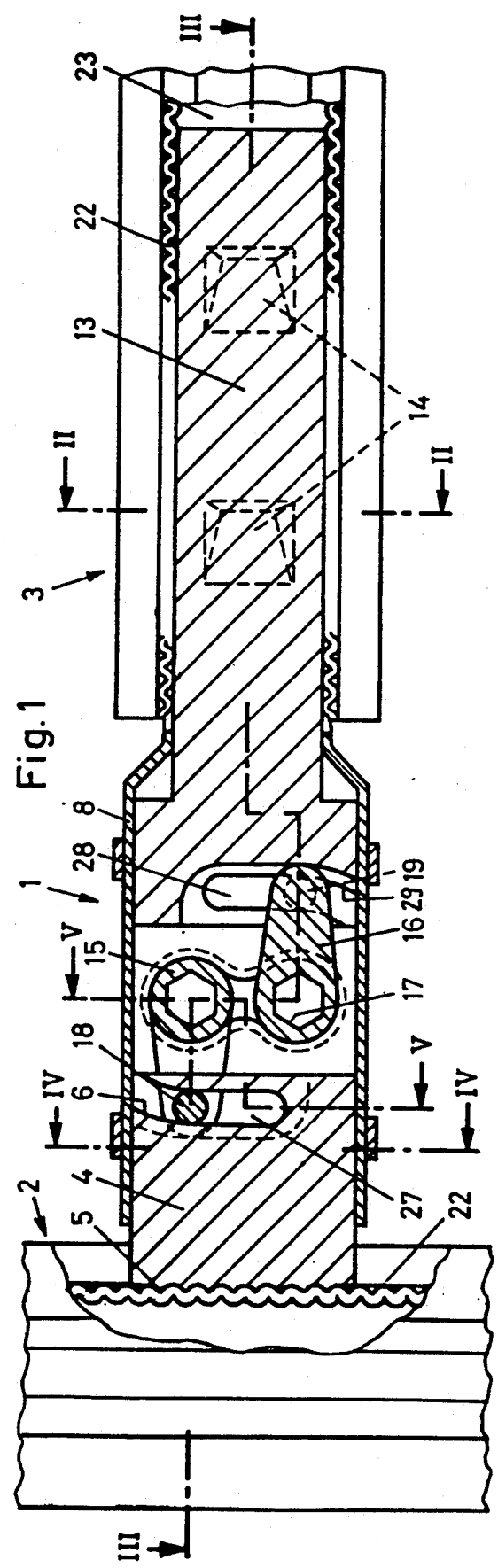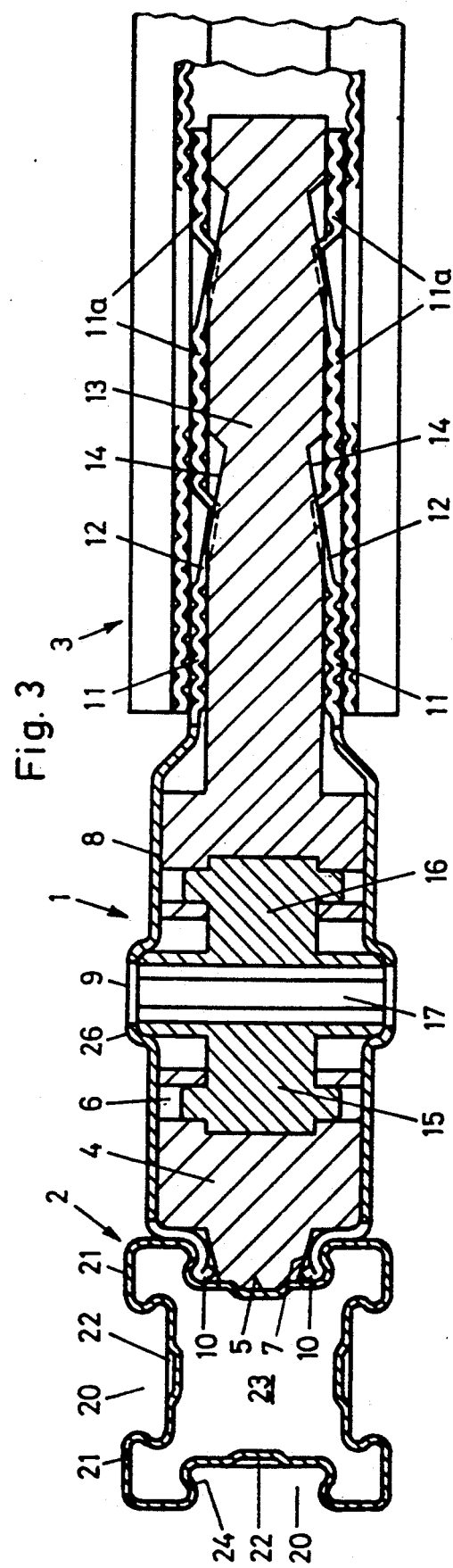

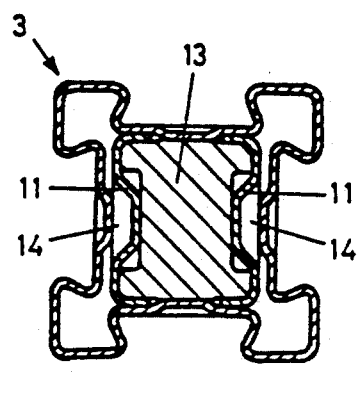
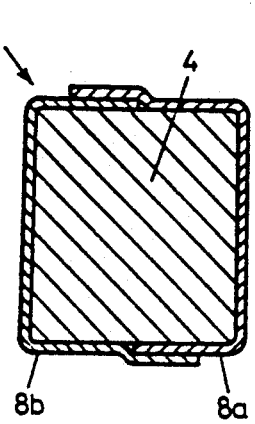
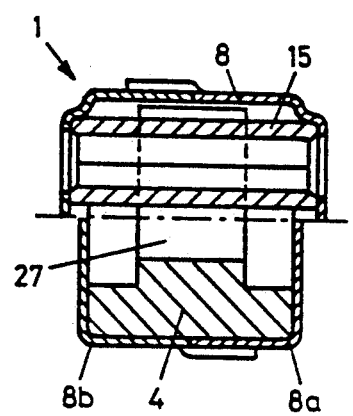
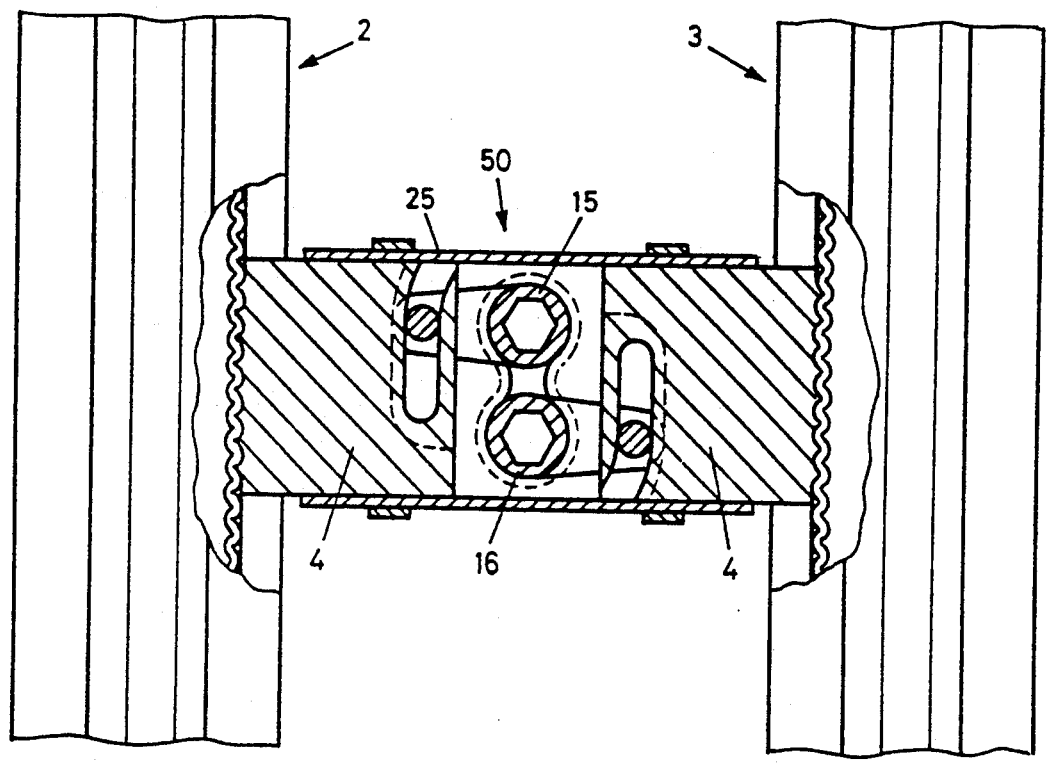

CONNECTION OF SECTIONAL BARS, OF A SUPPORT SYSTEM FOR A SANITARY APPARATUS

FIELD OF THE INVENTION

The present invention pertains to a connection for connecting sectional elements of a sanitary apparatus support system. The present invention also pertains to the shape of sectional bars that are particularly suitable for such connection, to the support system for the sanitary apparatus, as well as to a process for constructing such a support system.

BACKGROUND OF THE INVENTION

A connection of sectional bars on a support system for a sanitary apparatus similar to the present invention has become known from German Patent No. DE-A-34,10,499. The sectional bars are bars slotted at one end and are connected by brackets which are clamped with screws extending into the slots.

A connection on a support system for a sanitary apparatus, which has a connection part consisting of two plate-shaped parts and extends into a U-shaped profiled rails at two ends, has been known from DE-A-35,28,334. Similar connections and support systems have been known from Registered German Utility Patents Nos. DE-GMS-76,02,215, 76,26,246, and 80,00,819.

Numerous connections for support systems for installing sanitary apparatus are known. They all share the common feature of enabling simple and yet stable installation even of relatively heavy sanitary apparatus and of the pipelines and the like which are needed for them. Such support systems have the shortcoming that they must be exactly adapted, usually individually, to the actual installation location. Simple and clear inventory management as well as low-cost construction and installation is not possible.

SUMMARY AND OBJECTS OF THE INVENTION

The object of the present invention is to provide a connection of the above-described class which is particularly suitable for a support system for the installation of sanitary apparatus and permits simple inventory management and installation. This task is accomplished by the use of sectional bars and connection pieces. The sectional pieces have longitudinal grooves in their sides and have a longitudinal channel in their ends. The connection pieces have a first clamping means for engaging with a longitudinal groove of the sectional bar. The engagement of the first clamping means to the longitudinal groove is detachable and reattachable by simple movements of the first clamping means. The first clamping means thus connects the connecting piece to a sectional bar. The connection pieces also have a second clamping means which engages with the longitudinal channel of another sectional bar. This engagement of the second clamping means is also detachable and reattachable. The second clamping means causes the connection piece to be connected to another sectional bar. These sectional bars can also be attached to the sanitary apparatus and to the wall where the sanitary apparatus is to be mounted.

One essential aspect of the present invention is considered to be the fact that the sectional bars have identical cross sections and can be connected in all four directions in space. It is also essential that a rectangular frame can be prepared, in which all sectional bars and all connection pieces are arranged in one plane. The connection according to the aforementioned DE-A-34,10,499, is to the contrary by having the bracket and the sectional bars located in two different planes. As a result, the symmetry of the connection and of a sanitary apparatus constructed from it is substantially increased. In the case of three-dimensional arrangement of the sectional bars, the connection according to the present invention permits uniform and simple connection and consequently better possibility for planning. Pre-assembly by the installer or at the factory is substantially simpler than before. Since only one sectional bar is provided, inventory management is simpler. The uniform type of connection also makes it possible to reduce the installation time at the installation site and consequently also to reduce the costs.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 shows a sectional view through the device according to the present invention with two sectional bars arranged in a T-shaped pattern;

FIG. 2 shows a sectional view along the line II—II in FIG. 1;

FIG. 3 shows a sectional view along the line III—III in FIG. 1;

FIG. 4 shows a sectional view along the line IV—IV in FIG. 1;

FIG. 5 shows a sectional view along the line V—V in FIG. 1;

FIG. 6 shows a sectional view through a device according to a variant of the present invention, wherein two sectional bars extending in parallel to one another can be detachably connected;

DETAILED DESCRIPTION OF THE PREFERRED EMBODIMENT

Figure 7:
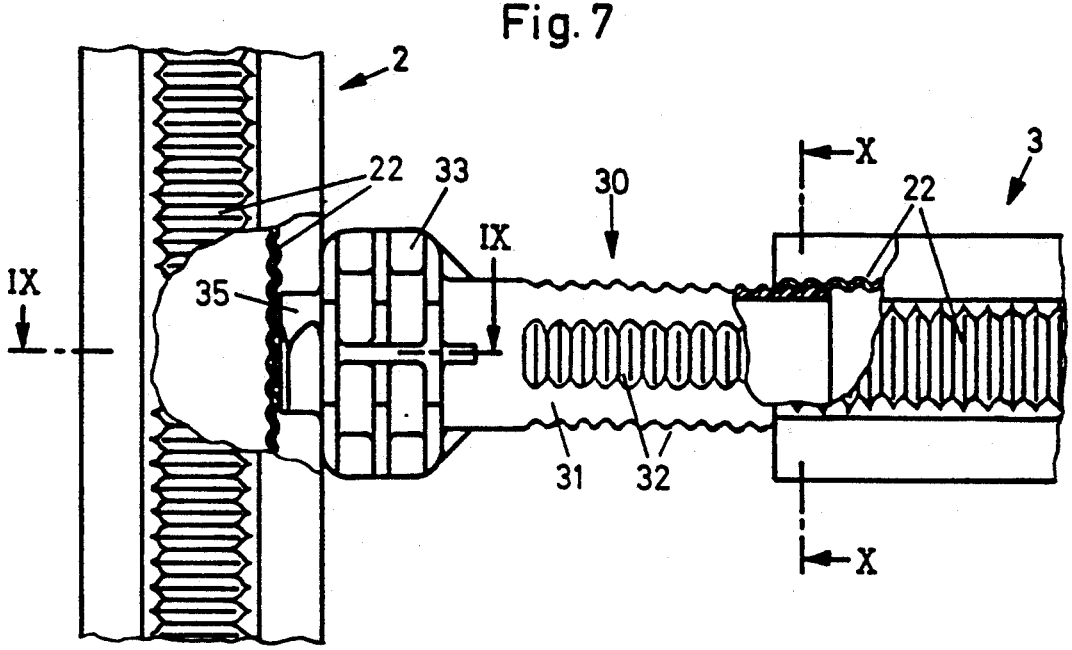
FIG. 7 shows a partial sectional view through another variant of a device according to the present invention.

The device shown in FIGS. 1 through 5 has a connection piece 1 which connects a hollow sectional bar 2 to a sectional bar extending at right angles to it. The two sectional bars 2 and 3 are of identical design and are made of, e.g., metal. As is shown by the cross section of the sectional bar 2 represented in FIG. 3, the sectional bar 2 has four identical longitudinal dovetailed grooves 20 that extend over the entire length of the sectional bar. The grooves 20 have a wall 22 of wave-like cross section at their bottoms. As is shown in the left-hand part of FIG. 1, the wall 22 is internally and externally profiled. The walls 22 preferably also extend over the entire length of the sectional bar 2. The flanks of the grooves 20 are formed by two flanges 21 of approximately heart-shaped cross section. As can be seen, the sectional bar 2 has a rotationally symmetric cross section. This is also true of the sectional bar 3.

The connection piece 1 has a bearing housing 8 which is made of, e.g., sheet metal and consists of two overlapping parts 8a and 8b (FIG. 4). Two wedges or projections 4 and 13 are inserted into and displaceable in the longitudinal direction of the bearing housing 8 with two guide bearings 15 and 16 which can be actuated independently of one another. The guide bearings 15 and 16 are rotatably mounted in projections 26 of the bearing housing 8 and have hexagonal openings 17, into which an Allen wrench can be inserted through openings 9 of the bearing housing. The guide bearings 15 and 16 extend, with a cam 18 and 19, respectively, into a respective recess 27 or 28 of the corresponding wedge. On pivoting the guide bearing 15 or 16, the respective cams 18 and 19 slide along a control surface 6 and 29, respectively, and displace the respective wedge 4 and 13 so that it will be pulled into the bearing housing 8 or displaced in the opposite direction out of the bearing housing.

At one end, the wedge 4 has two symmetric wedge surfaces 7 which cooperate with two clamping tongues 10 arranged on the bearing housing 8, so that the clamping tongues 10 are clamped against inclined internal surfaces 24 of the sectional bar 2. As a result, frictional connection of the connection piece 1 with the sectional bar 2 is guaranteed. When the wedge 4 is retracted into a position, not shown here, by pivoting the guide bearing 15, the clamping tongues 10 are freed, and the connection piece 1 can be pulled off from the sectional bar 2.

The wedge 4 has, on its front side, a profiling 5, which corresponds to the profiling of the wall 22. In the working position of the wedge 4 shown in the drawing, the profiling 5 of the wedge 4 engages the outer profiling of the wall 22. In this position, the wedge 4 is prevented from yielding due to the position shown of the guide bearing 15. The engagement of the wedge 4 with the wall 22 effectively prevents the connection piece 1 from being displaced in the longitudinal direction of the sectional bar 2.

The wedge 13 can be displaced analogously to the right or left in the bearing housing 8 with the guide bearing 16. To do so, a corresponding Allen wrench is inserted into the hexagonal opening 17. The wedge 13 cooperates with two brackets 11 which are pushed axially into the interior space 23 of the sectional bar 3. In the position shown, the wedge 13 spreads apart the two brackets 11 and presses them on the inside against opposite walls 22 of the sectional bar 3. To spread the brackets 11, wedge surfaces 12 and 14 are provided at the brackets 11 and at the wedge 13. The brackets 11 have a plurality of walls 11a with wave-like longitudinal section, which are profiled like the walls 22, at least on the outside. Thus, when the brackets 11 are spread, the walls 11a are in a positive-locking connection with the walls 22 of the sectional bar 3. If the wedge 13 is displaced to the left by a pivoting movement of the guide bearing 16, the connection piece 1 can be pulled out of the sectional bar, and the brackets 11 are able to yield toward the wedge.

The connections of the connection piece 1 with the sectional bar 2 and with the sectional bar 3 can thus be established and detached independently of one another. To displace the connection piece 1 along the sectional bar 2, the wedge 4 in the bearing housing 8 need only be retracted, after which the positive-locking and frictional connections are detached. When the wedge 4 is retracted, the connection piece 1 can be displaced in the longitudinal groove 20 over any amount in the longitudinal direction of the sectional bar 2, and the connection can be re-established at any point by pushing the wedge 4 forward. In order for the brackets 11 to be able to be pushed more or less deeply into the sectional bar 3, the distance between the two sectional bars can be adjusted to a limited extent. A design in which the two wedges 4 and 13 are adjusted jointly is also conceivable.

FIG. 6 shows another design of the device according to the present invention, in which two sectional bars 2 and 3 extending in parallel to one another are connected to a connection piece 50. In this design, two identical wedges 4, which are designed as explained above and are actuated individually with a respective guide bearing 15 or 16, are arranged in a bearing housing 25. The bearing housing 25 has clamping jaws, not shown here, which correspond to the clamping jaws 10 of the design explained previously. The sectional bars 2 and 3 may be of fully identical design in this case as well, in which case more than two wedges 4 for connecting more than two sectional bars are arranged in one bearing housing.

To connect two sectional bars, they are cut to the desired length at one end or the other. No further treatment of the sectional bars is necessary. The two sectional bars may be connected to the connection piece 1 in a T-shaped arrangement or to the connection piece 50 in a parallel arrangement in relation to one another. The only tool needed for this is an Allen wrench, with which the two wedges are brought into a retracted position. After the clamping tongues 10 and the brackets 11 have been inserted into a groove 20 or into the interior space 23, the respective wedges 4 and 13 are moved in the outward direction to the positions shown. The connection piece 1 or 50 is then firmly connected to the two sectional bars. Since the wedge 4 is in contact with the wall 22 over a relatively broad area, it is ensured that the connection piece 1 or 50 will be aligned exactly vertically to the profiled piece 2 and that this alignment will be maintained even under the effect of relatively strong forces. It is, of course, also possible to arrange a plurality of connection pieces 1 or 50 on one profiled piece 2. It is thus possible to prepare three-dimensional frames with high load-bearing capacity in a simple manner. Such frames are particularly suitable for the installation of sanitary apparatus.

FIGS. 7 through 11 show a device according to the present invention, which has a connection piece 30 that can be fully made of plastic at a particularly low cost.

The connection piece 30 has a shaft 31, which is hollow and has a square cross section. The four edges of the shaft 31 have a wave-shaped profile 32, which extends essentially over the entire shaft 31 and has a design corresponding to the profiling of the wall 22 of the sectional bars 2 and 3.

Figure 9:
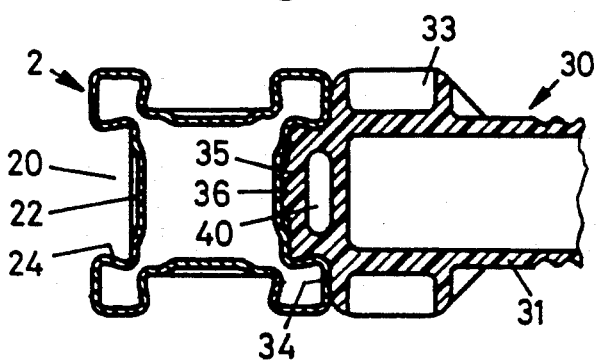
FIG. 9 shows a sectional view along the line IX—IX in FIG. 7.
Figure 8:
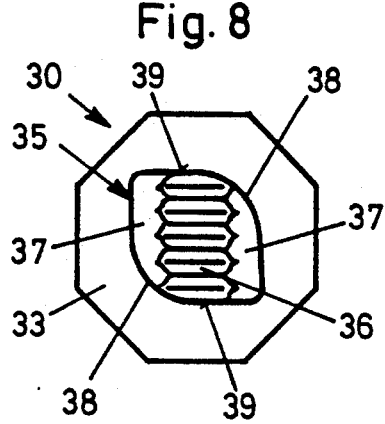
FIG. 8 shows a view of the front side of the connection part shown in FIG. 7.

A collar 33 with a shoulder 34 as well as a head 35 are made in one piece with the shaft 30. FIG. 8 shows the front view of the collar 33 and the head 35, and FIG. 9 shows the longitudinal section of the collar 33 and the head 35. The front side of the head 35 is provided with a wave-shaped profiling 36, which also has a design corresponding to the profiling of the wall 22. Next to the profiling 36, two laterally projecting wings 37 are made in one piece with the head 35; these extend behind a dovetailed groove 20 in the assembled state, as is shown in FIG. 9. The wings 37 extend at right angles to the row of grooves of the profiling 36 and are provided with rounded areas 38 in a rotationally symmetric arrangement at the transition to the lateral surfaces 39. The distance between the two lateral surfaces 39 is equal to the smallest width of the dovetailed groove 20. If the lateral surfaces 39 or the rounded areas 38 are aligned in parallel to the dovetailed groove 20, the head 35 can be inserted into or removed from the groove 20 at right angles to the sectional bar 2. However, if the head 35 thus inserted is rotated through 45° around the longitudinal axis of the connection piece 30, the wings 37 are caused to engage the internal surfaces 24 of the sectional bar 2 in the zone of the rounded areas 38, and the head 35 is thus clamped in the groove 20. Simultaneously with this rotary movement of the connection piece 30, the profiling 36 of the head 35 is aligned with and caused to engage the profiling 22 of the sectional bar 2. A cavity 40 behind the profiling 36 permits walls of the head 35 to yield elastically during the establishment of the connection. If the connection between the connection piece 30 and the sectional bar 2 has been established, the profiling 36 and 22 are also enmeshed with one another, and detachably clamped with the groove 20 by means of the wings 37. To detach the connection, the connection piece 30 is rotated through 45° in the opposite direction, namely, in the direction in which the rounded areas 38 come into contact with and finally move away from the internal surfaces 24. The enmeshing of the profiled pieces 36 and 22 is now also abolished, and the connection piece 30 can be displaced in the longitudinal direction of the groove 20 or can be lifted out of it. If the connection has been joined, the engagement of the two profiled pieces 36 and 22 prevents the connection piece 30 from being displaced in the longitudinal direction of the sectional bar 2 under load in this case as well. Despite the high stability, the connection can be established or separated only by rotation through 45°. At the same time, a connection with another sectional bar 3 can be established or detached, as will be explained in greater detail below.

Figure 11:
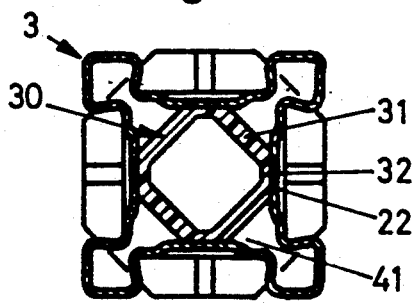
FIG. 11 shows a sectional view according to FIG. 10, but prior to rotation of the connection piece.
Figure 10:
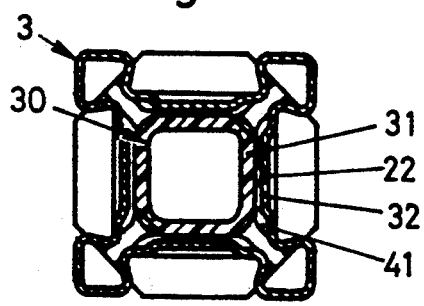
FIG. 10 shows a sectional view along the line X—X in FIG. 7.

To connect the connection piece 30 to the sectional bar 3, the shaft 31 is rotated, as is shown in FIG. 11, to the sectional bar 3, and pushed in this alignment into the cavity of the sectional bar 3. The profilings 32 are now freely displaceable in the expanded edges 41 of the sectional bar 3. If the shaft 31 is now rotated through 45° into the position shown in FIG. 10, the profilings 32 are caused to engage the profilings 22 of the sectional bar 3. The connection piece 30 and the sectional bar 3 are then snapped in the longitudinal direction, and can no longer be displaced in this direction. The connection can be separated at any time by a rotation through 45° in this case as well.

When connecting the two sectional bars 2 and 3 to the connection piece 30, both the bars 2 and 3 are simultaneously connected to the connection piece 30 by a rotation through 45°. In contrast to this, when connecting the connection pieces 1 or 50, the two sectional bars may be connected to the connection piece independently of one another. In contrast, the connection piece 30 may be manufactured from plastic by injection molding at a very low cost, and consequently it is also corrosion-resistant and lightweight.

A support system for sanitary apparatus, fittings, pipe parts, and pipelines and its installation will be explained on the basis of FIGS. 12 through 16. The sanitary apparatus are, e.g., a toilet, a bidet, a wash stand, or a urinal. These are connected to drain pipes 41 and flexible connection lines 42, as well as corresponding branch pipes, which are represented only schematically here. As is clearly apparent from FIGS. 12c through 12d, all the vertically extending line parts are arranged on the side, and the branch pipes extend from these essentially horizontally to the support frames 43 and 44 for the sanitary apparatus, not shown here.

Figure 12A:
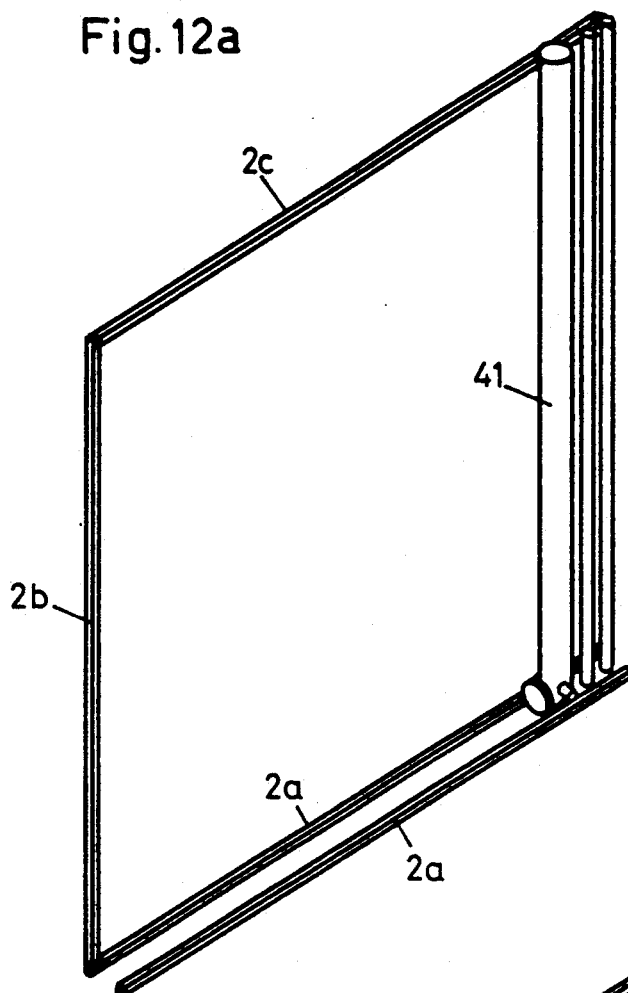
FIGS. 12a through 12e show schematically a sequence of installation during the construction of a support system according to the present invention.
Figure 12B:
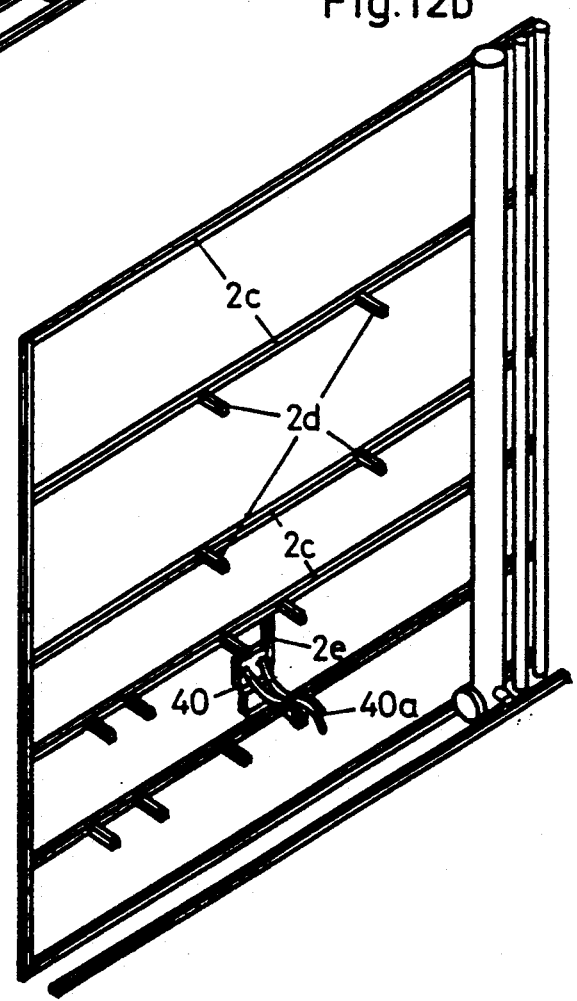

When installing the support system, a floor sectional bar 2a, two vertical sectional bars 2b, and one ceiling sectional bar 2c are connected, according to FIG. 12a, to form a rectangular, frame-like system part A, preferably using the sectional bars and connections as described farther above. The frame shown in FIG. 12a forms a reference frame for the further construction of the support system.

Figure 14:
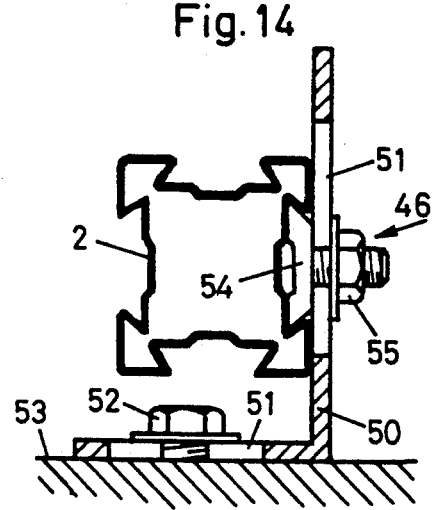
FIG. 14 shows a cross sectional view through a sectional bar fastened to a building body.
Figure 16:
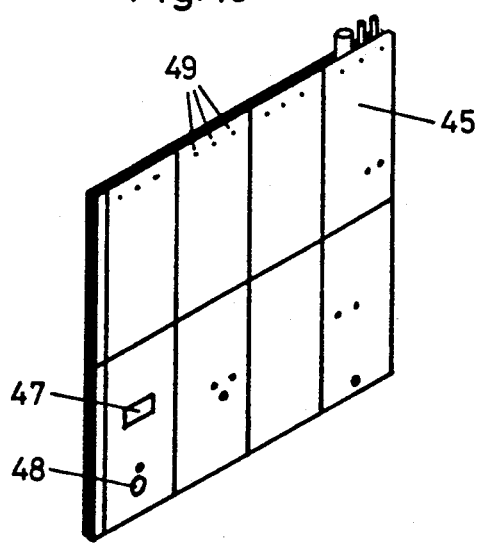
FIG. 16 shows schematically a support system according to the present invention with a cover.
Figure 15:
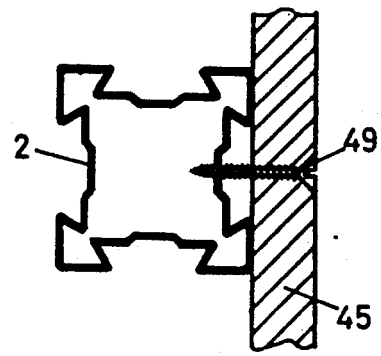
FIG. 15 shows a cross sectional view through a sectional bar with a gypsum board fastened to it.

According to FIG. 14, the floor, vertical, and ceiling sectional bars 2a, 2b, and 2c are fastened to the building with angle plates 50. To do so, the angle plate 50 has two slotted holes 51, through which a suitable screw 52 or a stud bolt of a sliding block 54, which is fixed with a nut 55, is passed for fastening.

Pipes and lines 41 extending vertically on the side are now fastened to the system part A, and further, horizontally extending sectional bars 2c are fastened, and transverse sectional bars 2d are fastened to the sectional bars 2c. However, it is advantageous in some cases to install the sectional bars 2c before the pipes and lines. Depending on the sanitary apparatus to be connected, connection members 40 and flexible lines 40a with vertically extending sectional bars 2e are fastened to the system part A.

Figure 12C:
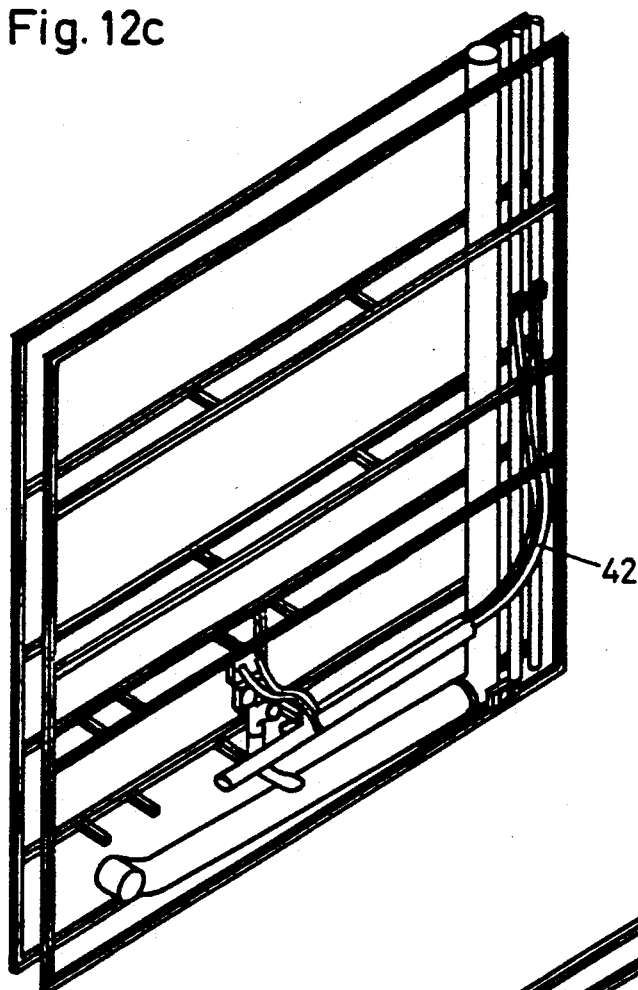
Figure 12D:
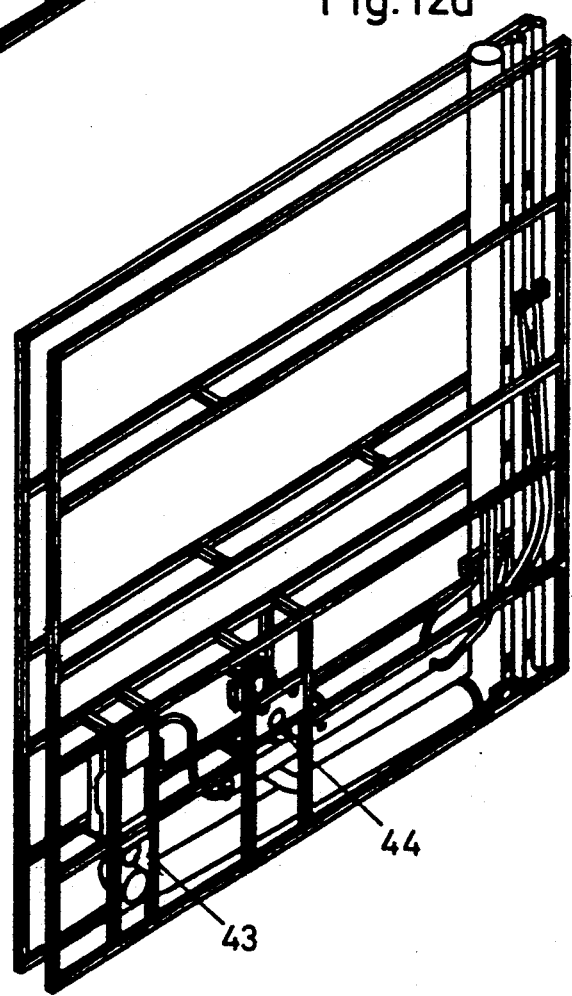
Figure 12E:
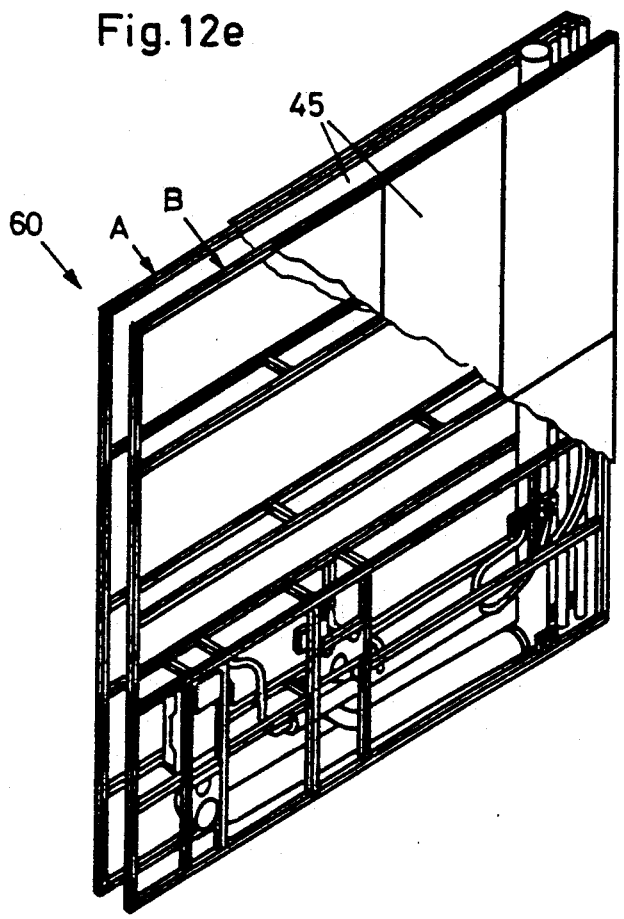
Figure 13A:
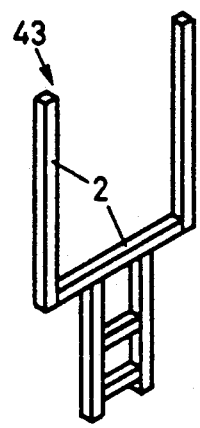
FIGS. 13a through 13b shown schematically a support system for a toilet bowl and a wash stand.
Figure 13B:
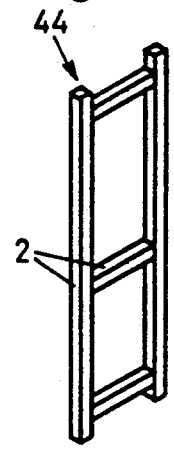

Relatively short transverse sectional bars 2d are now arranged on the system part A, and the support profile is complemented with another system part B and horizontally extending connection lines and pipes to form the arrangement shown in FIG. 12c.

Finally, the support frames 43 and 44, which may be pre-assembled, are put in place, and covered with gypsum boards 45 on one side or both sides of the support system, using self-tapping screws 49. The boards 45 are now provided with corresponding openings 47 and 48 for, e.g., operating plates and pipe connections. In the case of coverage on both sides according to FIG. 12e, the support system may form a complete inner wall. However, the support system may also be prepared as a support system leaning against a massive building wall. In the case of this design, only a system part B, which is fastened to the building wall with transverse sectional bars 2d, is needed.

The sectional bars 2a, 2b, 2c, 2d, and 2e have the same cross section profile and are connected to one another with the same connection pieces and preferably the above-described connection pieces 1, 30, and 50.

Using the known DLS (distance least square) calculation program and the exact dimensions of the construction location, the components, especially the length of the sectional bars, and their positions can be optimally calculated. The material consumption and the installation work can thus be optimized by computation, and consequently very rapidly and accurately. This permits highly efficient custom-made manufacture in the plant. The installer will receive a project-specific, assembled building kit with extensively pre-assembled components. The installer may, of course, also cut the sectional bars to the required lengths.

While specific embodiments of the invention have been shown and described in detail to illustrate the application of the principles of the invention, it will be understood that the invention may be embodied otherwise without departing from such principles.

What is claimed is:

1. A connection comprising:
   a first sectional bar having first longitudinal grooves, said first sectional bar having a substantially square cross section;
   a second sectional bar having second longitudinal grooves and a longitudinal channel positioned between said second longitudinal grooves, said second sectional bar having a substantially square cross section;
   a connection piece having a first clamping means for inserting into one of said first longitudinal grooves and detachably clamping said connection piece to said first sectional bar, said first clamping means having a head with laterally projecting wings and a front side of said head having profiling, said head is of size to be insertable into said one of said first longitudinal grooves and rotatable into a positive-locking engagement with said one of said longitudinal grooves, said connection piece having a second clamping means for insertion into said longitudinal channel of said second sectional bar and detachably clamping said connection piece to said second sectional bar.

2. A connection in accordance with claim 1, wherein: said first clamping means inserts substantially perpendicular to said one of said first longitudinal grooves and said second clamping means inserts substantially parallel to said longitudinal channel of said second sectional bar forming a perpendicular connection between said first sectional bar and said second sectional bar.

3. A connection in accordance with claim 1, wherein: said one of said first longitudinal grooves has a profiled surface.

4. A connection in accordance with claim 1, wherein: said one of said first longitudinal grooves has profiling extending substantially perpendicular to said one of said first longitudinal grooves.

5. A connection comprising:
   a first sectional bar having first longitudinal grooves, said first sectional bar having a substantially square cross section, and one of said first longitudinal grooves being dovetailed;
   a second sectional bar having second longitudinal grooves and a longitudinal channel positioned between said second longitudinal grooves, said second sectional bar having a substantially square cross section;
   a connection piece having a first clamping means for inserting into one of said first longitudinal grooves and detachably clamping said connection piece to said first sectional bar, said first clamping means having two clamping tongues extending laterally behind said dovetailed one of said first longitudinal grooves and a wedge arranged between said two clamping tongues, said wedge being displaceable against said two clamping tongues to spread apart said two clamping tongues and cause said two clamping tongues to engage with said first longitudinal groove in a positive locking manner, said connection piece having a second clamping means for insertion into said longitudinal channel of said second sectional bar and detachably clamping said connection piece to said second sectional bar, said second clamping means having a wedge engaging said longitudinal channel of said second sectional bar, said wedge of said first clamping means and said wedge of said second clamping means being adjustable to engage said first sectional bar and said second sectional bar, said second clamping means having two profiled brackets and said wedge of said second clamping means being displaceable between said two brackets to spread apart said two brackets.

6. A connection in accordance with claim 5, wherein: said two brackets have wedge surfaces positioned against wedged surfaces of said wedge of said second clamping means, said wedge surface of said two brackets cooperating with said wedge surface of said wedge to spread apart said two brackets when said wedge of said second clamping means is moved.

7. A connection in accordance with claim 5, wherein: said two brackets are arranged on a bearing housing.

8. A connection in accordance with claim 5, wherein: said two brackets have an approximately U-shaped cross section and partially surround said wedge of said second clamping means.

9. A sectional bar for a sanitary apparatus support system, the sectional bar comprising:
   sheet metal sections bent into a bar and providing a cross sectional square shape, said sheet metal sections also having longitudinal grooves recessed into four sides of said cross sectional square shape and accessible from outside said cross sectional square shape, said longitudinal grooves having a dovetail shape, said longitudinal grooves also having profiling in a middle portion of said longitudinal grooves and extending at substantially right angles to said longitudinal grooves, said profiling is only in said middle portion of said longitudinal grooves and said profiling cooperates with said longitudinal grooves to provide connection sites onto said bar.

10. A sectional bar in accordance with claim 9, wherein:
    said bar has longitudinal edges designed as flanges of heart-like cross section that are open toward an inside of said bar.

* * * * *